United States Patent
Yoshikawa et al.

(10) Patent No.: US 6,188,790 B1
(45) Date of Patent: *Feb. 13, 2001

(54) METHOD AND APPARATUS FOR PRE-RECOGNITION CHARACTER PROCESSING

(75) Inventors: Takatoshi Yoshikawa, Ogaki; Hiromitsu Kawajiri, Gifu; Hiroshi Horii, Ogaki; Junji Tanaka, Tottori, all of (JP)

(73) Assignee: Tottori Sanyo Electric Ltd., Tottori-Ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/807,804

(22) Filed: Feb. 26, 1997

(30) Foreign Application Priority Data

Feb. 29, 1996 (JP) .................................................. 8-042870
Mar. 12, 1996 (JP) .................................................. 8-055124

(51) Int. Cl.$^7$ .............................. G06K 9/46; G06K 9/66; G06K 9/34; G06K 9/18
(52) U.S. Cl. ........................ 382/194; 382/177; 382/185; 382/217; 382/274
(58) Field of Search .................... 382/194, 200, 382/205, 195, 185, 198, 274, 156, 217, 193, 218, 192, 177, 254, 209; 379/93.18

(56) References Cited

U.S. PATENT DOCUMENTS

| | | | |
|---|---|---|---|
| 3,605,093 | * | 9/1971 | Parks et al. ........................ 382/198 |
| 3,810,093 | * | 5/1974 | Yasuda et al. ..................... 382/223 |
| 4,259,661 | * | 3/1981 | Todd .................................. 382/205 |
| 4,379,283 | * | 4/1983 | Ito et al. ............................ 382/194 |
| 5,151,951 | * | 9/1992 | Ueda et al. ........................ 382/156 |
| 5,197,107 | * | 3/1993 | Katsuyama et al. ............... 382/209 |
| 5,293,256 | * | 3/1994 | Fukushima et al. ............... 358/468 |
| 5,621,818 | * | 4/1997 | Tashiro .............................. 382/227 |

FOREIGN PATENT DOCUMENTS

| | | |
|---|---|---|
| 1-78395 | 3/1989 | (JP) . |
| 4-177485 | 6/1992 | (JP) . |
| 4-260987 | 9/1992 | (JP) . |
| 5-108882 | 4/1993 | (JP) . |
| 6-44409 | 2/1994 | (JP) . |

\* cited by examiner

*Primary Examiner*—Edward L. Coles
*Assistant Examiner*—David Rosenblum
(74) *Attorney, Agent, or Firm*—Sheridan Ross P.C.

(57) ABSTRACT

An apparatus for recognizing characters read by a reading unit. A circumscribing rectangle of a read character is formed, and the degree of narrowness of that circumscribing rectangle is acquired. Characters having a degree of narrowness that is equal to or greater than a predetermined value are selected and blank areas are added to the circumscribing rectangle to yield a character area with a corrected degree of narrowness. The character is normalized by converting the character area to a specified size, and is recognized based on the normalized character. It is therefore possible to normalize even characters significantly elongated vertically or horizontally for easier recognition and to group their character patterns.

13 Claims, 10 Drawing Sheets

METHOD AND APPARATUS FOR PRE-RECOGNITION CHARACTER PROCESSING

BACKGROUND OF THE INVENTION

1. Field of the Invention

The present invention relates to a method and apparatus for reading and recognizing characters, printed or handwritten, on a sheet of paper.

2. Description of the Related Art

Japanese Unexamined Patent Publication Nos. 64-78395 and 5-108882 disclose apparatuses for reading and recognizing characters printed or handwritten on a sheet of paper. To execute character recognition, image data of a character read by a CCD (Charge Coupled Device; solid image sensing elements) in a reading section is converted to binary image data by a binarization section, and a character area is extracted from this binary image. The extracted character area is then segmented to mesh areas in a matrix form (e.g., 8×8).

For each mesh area, the ratio of the area of black pixels to the area of the mesh area, or the density, is acquired. The density distribution of mesh areas in a character area represents the characteristics of the character pattern. Character recognition is performed by comparing the density distribution for a character area with the density distributions of character patterns in a previously prepared dictionary based on the characteristics.

Handwritten characters and printed characters vary in size and shape even if they are the same character. To facilitate comparison of a handwritten or printed character with character patterns in the dictionary, therefore, size and outline shaping processing or normalization is performed.

Normalization has been accomplished mainly in two ways. One is to normalize a rectangle circumscribing a character and the other is to normalize a square circumscribing a character. As shown in FIG. 9, the former method normalizes a character by forming a circumscribing rectangle F with respect to the character pattern L of a binary image and converting the circumscribing rectangle F to a specified area S of a predetermined square size. According to this method, even if the input characters differ in size and shape, their character patterns L, after normalization, become substantially the same in size and shape as shown at the lower portions in FIGS. 9(a) and 9(b), thus ensuring a constant aspect ratio (the ratio of the vertical size to the horizontal size). This scheme is advantageous in that the number of character patterns in the dictionary can be reduced.

Figure 9A:
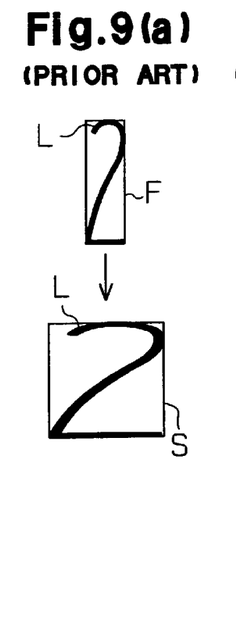
FIGS. 9(a) to 9(d) and 10(a) to 10(d) are explanatory diagrams of a conventional normalizing process for character patterns.
Figure 9B:
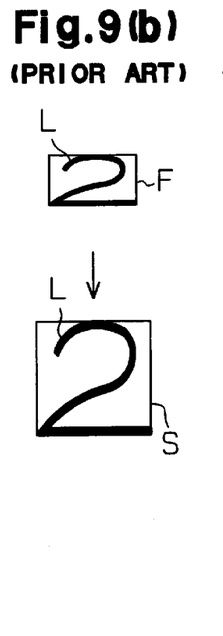
Figure 9C:
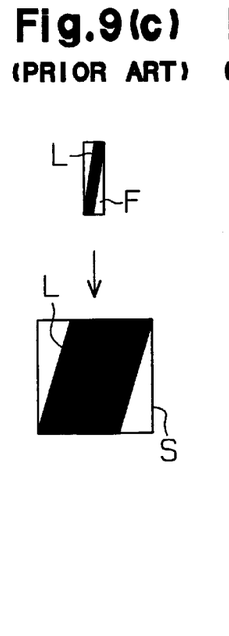
Figure 9D:
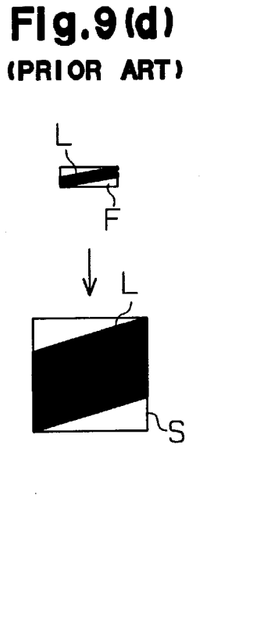
Figure 10A:
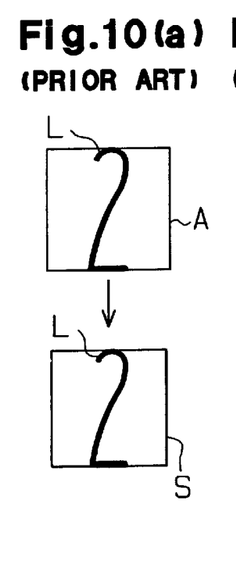
Figure 10B:
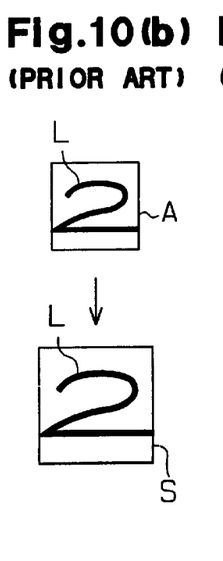
Figure 10C:
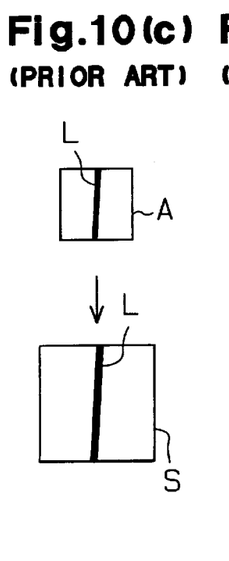
Figure 10D:
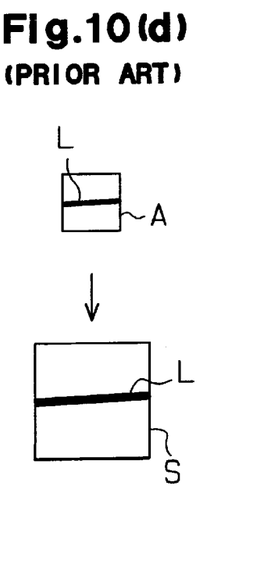

In the case of a vertically elongated character such as "1" and a horizontally elongated character such as "–" as shown in FIGS. 9(c) and 9(d), however, the normalization based on a circumscribing rectangle fills most of the specified area S with black pixels as shown in the lower portions in those drawings. This makes character recognition difficult.

However, as shown in FIG. 10, the other method for normalizing a character based on a circumscribing square normalizes a character by forming a circumscribing square "A" with respect to the character pattern L of a binary image and converting the circumscribing square "A" to a specified area S. Space, or white pixel area, is added to the sides of the character or above and below a character, depending on whether the character is elongated vertically or horizontally. This method therefore overcomes the aforementioned shortcoming of the normalization that is based on a circumscribing rectangle.

When a character like "7" or "9" is written significantly long vertically by, for example, a hand, however, adding space to the lateral sides of the character at the time of normalization may yield a deformed character that is difficult to recognize. The same applies to characters that are significantly horizontally elongated. Since the shape of a read character directly reflects on the character area L after normalization in the circumscribing-square based normalization scheme as shown at the lower portions in FIGS. 10(a) and 10(b), there are various sizes and shapes for normalized character patterns L that cannot be classified. This necessitates the preparation of many character patterns in the dictionary.

A solution to this problem was proposed in, for example, Japanese Unexamined Patent Publication No. 5-108882, which discloses an apparatus for extracting a character area in the form of a circumscribing rectangle with respect to the character pattern of a binary image and changing the number of segments of the character area in accordance with the aspect ratio of the character area. With regard to vertically elongated characters, this method increases the number of segments in the vertical direction and reduces it in the horizontal direction. For horizontally elongated characters, the number of segments is reduced vertically and is increased horizontally.

Even a character written significantly long in either direction is normalized without being deformed, and it is easily recognized. This character recognition apparatus however needs exclusive dictionaries for different ways of segmentation and thus suffers an increased number of dictionaries and an increased number of character patterns to be stored in the dictionaries.

SUMMARY OF THE INVENTION

Accordingly, it is an object of the present invention to provide a character recognition method and apparatus capable of substantially grouping character patterns after normalization irrespective of differences in size and shape between characters such as those apparent between vertically elongated characters and horizontally elongated characters, thus ensuring a reduction in the number of character patterns to be stored in a dictionary.

To achieve this object, this invention provides a novel method and apparatus for recognizing characters read by a reading unit. The circumscribing rectangle of a read character is formed and the degree of flatness of that circumscribing rectangle is acquired. A character of which degree of flatness is equal to or greater than a predetermined value is selected and a blank area is added to the circumscribing rectangle of the selected character to yield a character area with a corrected degree of flatness. The character is normalized by converting the character area to a specified size and is recognized based on the normalized character. It is therefore possible to normalize even characters significantly elongated vertically or horizontally for easier recognition and to group their character patterns.

DETAILED DESCRIPTION OF THE PREFERRED EMBODIMENTS

Figure 1:
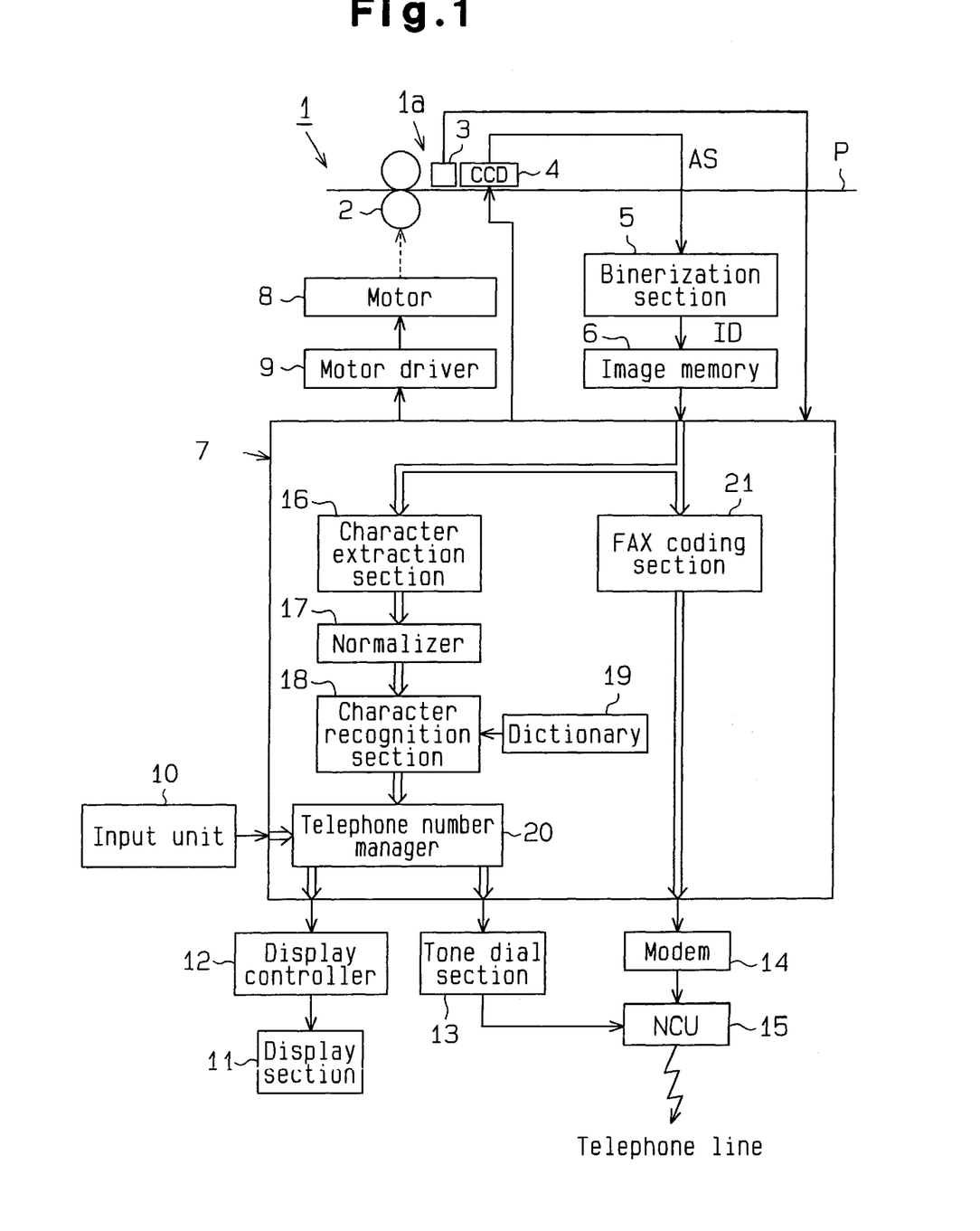
FIG. 1 is a block diagram of a facsimile machine according to the first embodiment of the invention.

The first embodiment of the present invention will now be described with reference to FIGS. 1 through 4. According to this embodiment, a character recognition apparatus is adapted to a facsimile machine. FIG. 1 shows the electric circuit of a facsimile machine 1. The facsimile machine 1 has paper inserting rollers 2 in a paper inserting port 1a. A paper detector 3 and a CCD (Charge Coupled Device) image sensor 4 are provided at the paper inserting port 1a.

The CCD image sensor 4 is connected to a control section 7 via a binarization section 5 and an image memory 6. Connected to this control section 7 are the paper detector 3, a motor driver 9 for controlling a motor 8 to drive the paper inserting rollers 2, an input unit 10, a display controller 12 for driving a display section 11, a tone dial section 13 and a modem 14. The tone dial section 13 and modem 14 are connected to an NCU (Network Control Unit) 15, which is connected to a telephone line.

The control section 7 includes a character extraction section 16, a normalizer 17, a character recognition section 18, a dictionary 19, a telephone number manager 20 and a FAX (facsimile) coding section 21. The paper detector 3 is comprised of, for example, an optical sensor, which senses paper P being inserted in the paper inserting section 1a and outputs a detection signal. The detection signal is sent to the control section 7.

The CCD image sensor 4, which comprises multiple solid image sensing elements, generates an analog image signal AS according to the optical image of a character written on the paper P. This image signal AS is sent to the binarization section 5. The binarization section 5 converts the analog image signal AS, sequentially sent from the CCD image sensor 4, to a monochromatic binary digital image signal (hereinafter called "binary image signal") ID. This binary image signal ID is sent to the image memory 6.

The image memory 6, which is comprised of a RAM (Random Access Memory), stores the binary image signal ID sent from the binarization section 5 as image data in a readable fashion in a memory area according to an address signal supplied from the control section 7. Based on the detection signal from the paper detector 3, the control section 7 outputs a read timing signal for controlling the reading speed of the CCD image sensor 4. The control section 7 sends a drive control signal to the motor driver 9 in such a way that the motor 8 is driven in synchronism with this read timing signal.

The input unit 10 has numerical keys for inputting a telephone number and a FAX transmission key. Key input data from the input unit 10 is sent to the control section 7. The display section 11, which is comprised of a liquid crystal display (LCD), for example, displays number data input to the control section 7 from the input unit 10 and a telephone number, which is read and identified by the control section 7. The display section 11 is driven and controlled via the display controller 12 by the control section 7.

The input unit 10 and the display controller 12 are connected to the telephone number manager 20. The telephone number manager 20 comprises a storage section for storing telephone number data sent from the character recognition section 18 and from the input unit 10. The number manager 20 also includes a processing section for processing data stored in the storage section based on the input data from the input unit 10. The telephone number manager 20 displays number data, which has been entered through the input unit 10 in a number confirmation mode, on the display section 11 and corrects the telephone number data in the storage section that corresponds to the displayed telephone number based on the input number data. When the transmission key of the input unit 10 is operated, the telephone number manager 20 reads the telephone number data corresponding to the displayed telephone number from the storage section and transfers it to the tone dial section 13.

The tone dial section 13 generates a tone signal for a push button phone system in accordance with the telephone number data sent from the telephone number manager 20. This tone signal is sent to the NCU 15. The NCU 15 selectively switches the tone dial section 13 and the modem 14 to a telephone line based on a control signal from the control section 7 and checks if the telephone line is connected to a facsimile machine at the destination.

Based on a signal issued by the operation of the FAX transmission key of the input unit 10, the FAX coding section 21 converts image data, sequentially read from the image memory 6, to a coded signal for facsimile transmission. After the connection of the telephone line to the destination, the coded signal is sent on the telephone line to the connected destination via the modem 14 and the NCU 15. The control section 7 performs a character recognition process by means of the character extraction section 16, the normalizer 17, and the character recognition section 18 based on program data illustrated by the flowchart in FIG. 2. According to this embodiment, the telephone number or FAX number TN, appearing on a predetermined area R at the head of the paper P inserted through the paper inserting section 1a, is the target for character recognition (see FIG. 11).

For pixels of binary image data read from the image memory 6, the character extraction section 16 acquires inclined lines according to a plurality of possible inclination angles of the string of characters TN with respect to the upper edge of the paper P. The character extraction section 16 acquires a vertical component histogram for each inclined line and determines the direction of the character string based on the inclined line to which areas of one or more pixels belong most in this histogram. Then, the character extraction section 16 establishes a character area for each character in accordance with locations where at least one pixel is represented by the histogram. The character extraction section 16 determines rectangular areas that substantially circumscribe individual characters based on the acquired direction of the character string and extracts characters one by one in accordance with the rectangular areas.

Figure 3A:
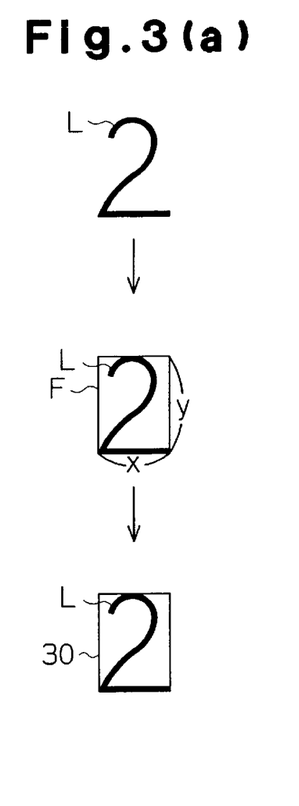
FIGS. 3(a) to 3(c), 4(a) and 4(b) are explanatory diagrams of a normalization process for character patterns.
Figure 3B:
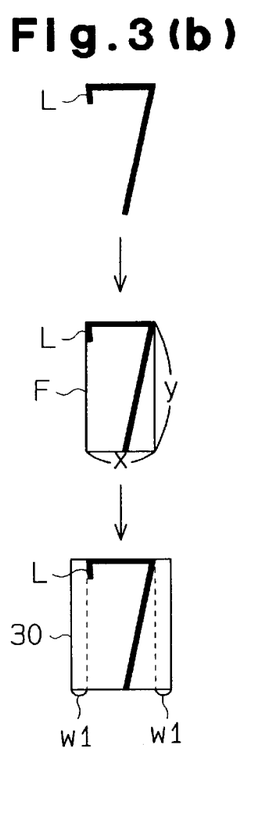
Figure 3C:
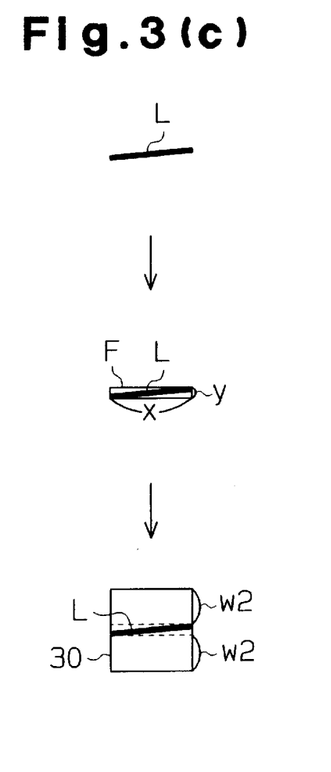

Based on a link information of pixels in each rectangular area extracted by the character extraction section 16, the normalizer 17 defines a circumscribing rectangle F for each character as shown in FIG. 3 and computes the aspect ratio of the circumscribing rectangle F. Further, the normalizer 17 corrects the circumscribing rectangle according to the aspect ratio to establish a character area 30 shown in FIGS. 3(*a*) to 3(*c*).

The aspect ratio R is given by the following equation:

$$R=y/x$$

where x is the length of the circumscribing rectangle in the x direction (horizontal direction) and y is the length of the circumscribing rectangle in the y direction (vertical direction). As the character becomes vertically elongated, the aspect ratio R increases. As the character becomes horizontally elongated, the aspect ratio R decreases.

After acquiring the aspect ratio R, the normalizer 17 compares the aspect ratio R with a constant α (<1) and β (>1). When α<R<β, the normalizer 17 sets the circumscribing rectangle F as the established character area 30 without correcting it. When R>β, i.e., for a vertically elongated character, the normalizer 17 adds space W1 on both sides of the circumscribing rectangle F in the x direction to widen the circumscribing rectangle F and sets the resultant circumscribing rectangle F as the established character-area 30, as shown in FIG. 3(*b*). When R<α, i.e., for a horizontally elongated character, the normalizer 17 adds space w2 on both sides of the circumscribing rectangle F in the y direction to increase the height of the circumscribing rectangle F and sets the resultant circumscribing rectangle F as the established character area 30, as shown in FIG. 3(*c*).

In this embodiment, for example, α=0.6 and f=2.3. The widths w1 and w2 to be added are computed based on the following equations, $$w1=(y-x)/a \text{ (where } A \geq 2\text{) and}$$

$$w2=(x-y)/B \text{ (where } B \geq 2\text{)}$$

and A and B are respectively set to, for example, "4" and "2" in this embodiment.

Figure 4A:
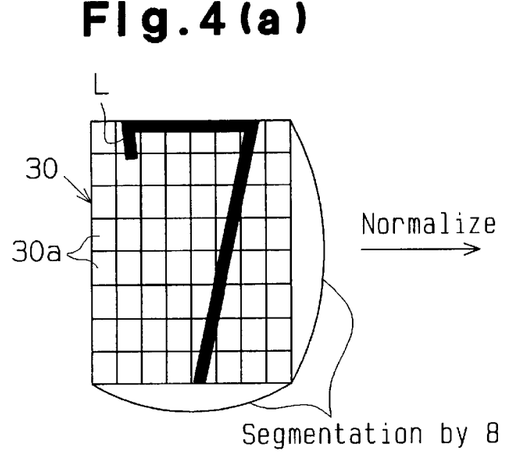
Figure 4B:
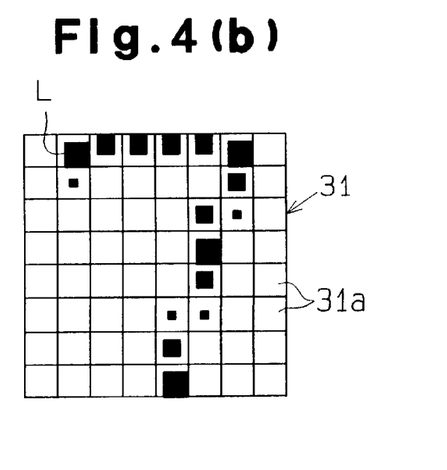

The character area 30, corrected based on the aspect ratio R, is normalized by means of being divided into mesh areas 30a in an 8×8 matrix form as shown in FIG. 4(*a*). Next, the ratio of the black area to the total areas of each mesh area 31a, or the density distribution, is acquired. The density distribution for the 8×8 matrix represents the characteristics of the character to be recognized.

The character recognition section 18 is connected to the dictionary 19, which has been prepared in advance. Stored in the dictionary 19 are the density distributions of reference character patterns. The character recognition section 18 compares the density distributions of reference character patterns with the density distribution of the character pattern of the established character area 30 to determine the similarity. A reference character having characteristics that are most similar to that of the target character for recognition is specified.

The dictionary 19 retains graphical characteristics or a density distribution for each of the fonts (including italics) of all the numerals and symbols of the numeric keys of the input unit 10. The characters TN recognized by the character recognition section 18, i.e., numerals and symbols of a telephone number or a FAX number are sent to the telephone number manager 20.

The operation of the thus constituted facsimile machine 1 will now be discussed.

In transmitting printed data through the facsimile machine 1, first, the telephone number or FAX number TN of the destination is printed or handwritten in a predetermined area A on the paper P. The paper P is then inserted, with the area A as the top, in the paper inserting section 1a of the facsimile machine 1.

When receiving the detection signal for the paper P from the paper detector 3, the control section 7 sends the read timing signal to activate the CCD image sensor 4 and causes the motor driver 9 to drive the motor 8. As a result, the rollers 2 rotate to feed the paper P at a predetermined speed so that the predetermined area A comes inside the facsimile machine 1.

The CCD image sensor 4 scans characters in the predetermined area A to yield an analog image signal AS. This analog image signal AS is converted by the binarization section 5 to a binary image signal ID, which is stored in the image memory 6. The stored image data is sequentially transferred to the character extraction section 16. The character recognition process, which is performed by the character extraction section 16, the normalizer 17 and the character recognition section 18, will now be described with reference to the flowchart in FIG. 2.

Figure 2:
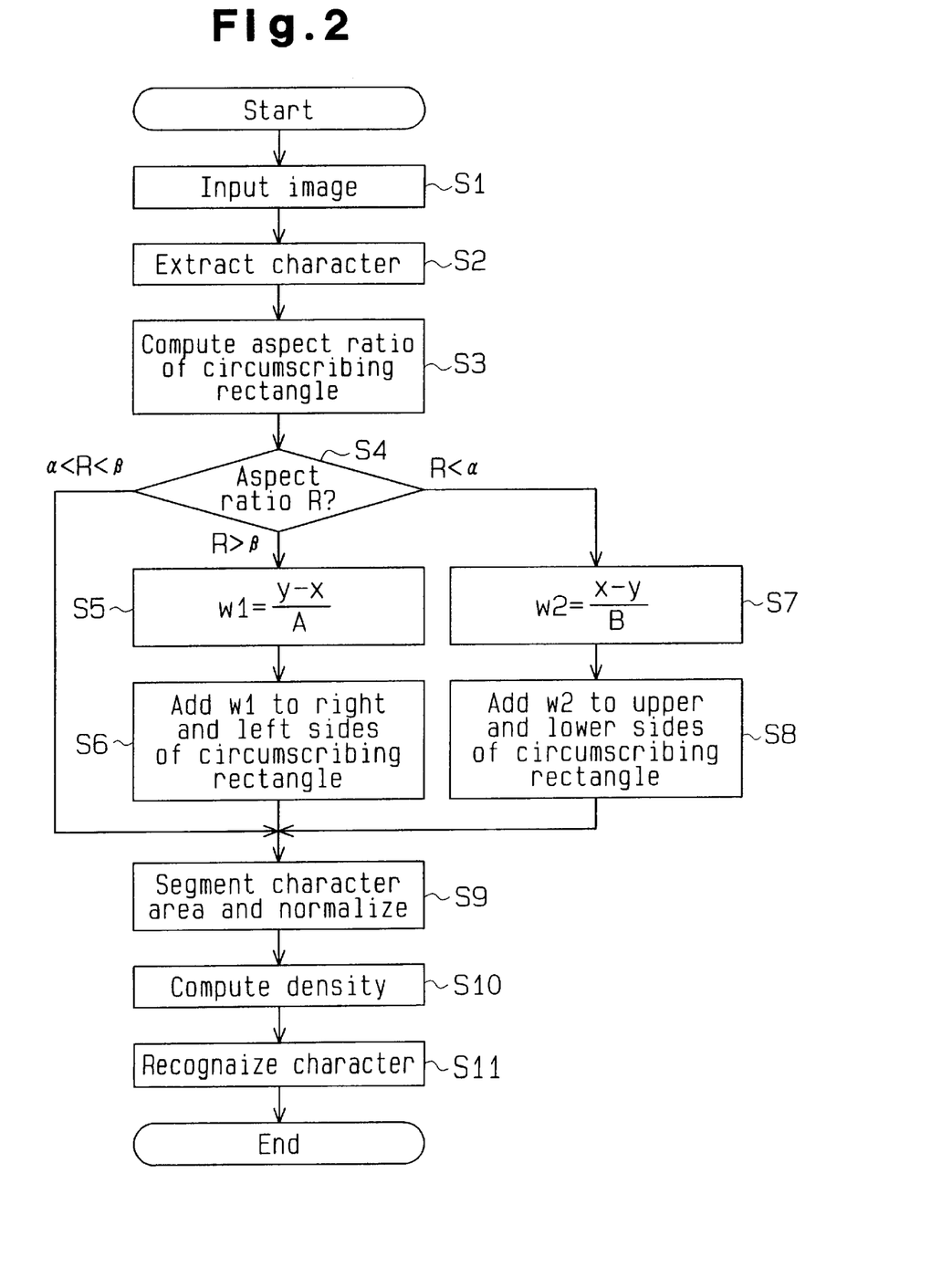
FIG. 2 is a flowchart of a character recognition process according to the first embodiment.

First, the binary image data read from the predetermined area A on the paper P is transferred to the character extraction section 16 from the image memory 6 in step S1. In the next step S2, the character extraction section 16 acquires the direction of the string of characters and rectangular areas thereof from the binary image data and extracts each rectangular area as described above. The individual rectangular areas are then shaped in steps S3 to S8.

In step S3, the normalizer 17 defines the circumscribing rectangle F of each character based on the link information of the pixels in the associated rectangular area. In the case of characters "2", "7" and "–" shown in the upper portions of FIGS. 3(*a*) to 3(*c*), for example, circumscribing rectangles F of characters L are formed as shown in the middle portions in the drawings. Then, the aspect ratio y/x (=R) of the circumscribing rectangle F is computed.

In step S4, the aspect ratio R is compared with constants α and β. When α<R<β is satisfied, the process proceeds to step S9. When R>β is met, the process proceeds to step S5, and when R<α is met, the process proceeds to step S7. The aspect ratio R (=y/x) will be greater for a vertically elongated character such as "7" shown in FIG. 3(*b*). The aspect ratio R will be smaller for a horizontally elongated character such as "–" shown in FIG. 3(*c*).

In this embodiment, α=0.6 and β=2.3. The processing according to a difference in aspect ratio R will be discussed below on the assumption based on those two values that the character "2" in FIG. 3(*a*) satisfies α<R <β, the character "7", in FIG. 3(*b*) satisfies R>β and the character "–" in FIG. 3(*c*) satisfies R<α.

In the first case where the character in the circumscribing rectangle F is "7" in FIG. 3(*b*), R>β is met so that the process proceeds to step S5. In step S5, w1 =(y−x)/A (A=4 in this embodiment) is computed from the height y and the width x of the circumscribing rectangle F. In the subsequent step S6, space w1 is added to both the right side and the left side of the circumscribing rectangle F to set a character area 30 as shown at the lower portion in FIG. 3(*b*). As the character extends longer in the vertical direction (i.e., as the aspect ratio R becomes larger), a larger space w1 is added. For a character significantly elongated vertically, like "1," therefore, a large space w1 is added.

Where the character in the circumscribing rectangle F is "–" in FIG. 3(*c*), R<α is met so that the process proceeds to step S7. In step S7, w2=(x−y)/B (B=2 in this embodiment) is computed from the height y and the width x of the circumscribing rectangle F. In the subsequent step S8, space w2 is added to the upper and lower sides of the circumscribing rectangle F to make the character area 30 more square as shown at the lower portion in FIG. 3(c). As the character extends in the horizontal direction (i.e., as the aspect ratio R becomes smaller), a large space w2 is added. For a character significantly elongated horizontally, like "−", therefore, large space w2 is added.

In the case where the character in the circumscribing rectangle F is "2" in FIG. 3(a), $\alpha<R<\beta$ is satisfied so that the process proceeds to step S9. In other words, with respect to any character L that is neither vertically elongated nor horizontally elongated, the area surrounded by the circumscribing rectangle F is set as the character area 30.

In step S9, the character area 30 set in accordance with the aspect ratio R is segmented to mesh areas 30a in an 8×8 matrix form to be normalized as shown in FIG. 4(a). When normalization is performed, a vertically elongated character pattern L with the aspect ratio R>β is stretched horizontally. The character area 30, which contains a horizontally elongated character pattern L with the aspect ratio R<α, always becomes a square because of the space w2 added. The character area 30 is enlarged directly.

Figure 7A:
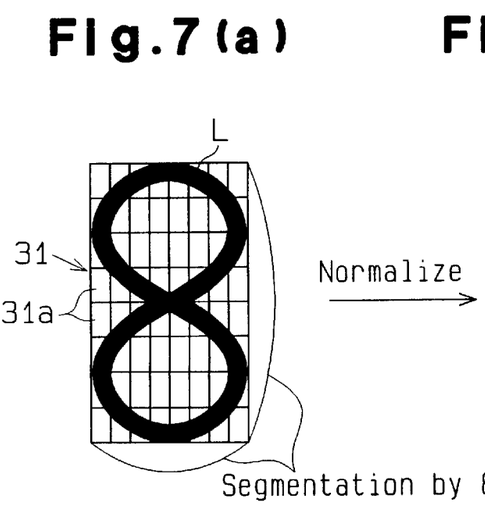
FIGS. 7(a) and 7(b) are explanatory diagrams of a normalizing process for character patterns.
Figure 7B:
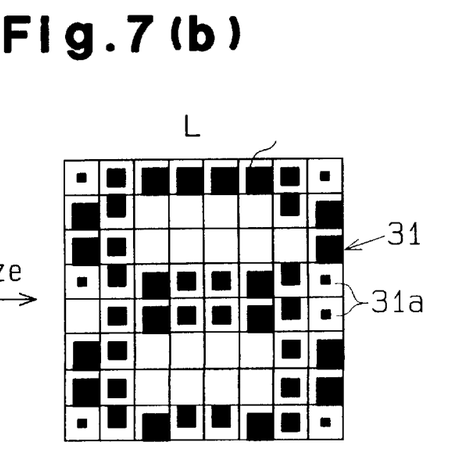

A character pattern L that satisfies $\alpha<R<\beta$ is converted so as to occupy the outline of a specified area 31 shown in FIG. 7(b). Therefore, the same characters satisfying $\alpha<R<\beta$, even if they differ in size or font, are converted to character patterns L that have substantially similar shapes.

In the next step S10, the densities (the ratios of black pixels) of the individual mesh areas 31a in the specified area 31 are obtained and the density distribution in the specified area 31 is output as the graphical characteristics of that character pattern L.

In step S11, the character recognition section 18 compares the density distributions (the characteristic amounts) of reference character patterns stored in the dictionary 19 with the density distributions (the characteristic amount) of the character pattern L acquired in step S10 and selects the reference character whose characteristic is most similar to that of the character pattern L. In this manner, the telephone number TN written in the predetermined area A on the paper P is recognized.

The recognized telephone number TN is stored in the telephone number manager 20 and is displayed on the display section 11 via the display controller 12. When a user confirms that the displayed telephone number is the destination telephone number, the user can operate the transmission key of the input unit 10 to start sending a facsimile according to the telephone number TN recognized. In response to the manipulation of the transmission key, the telephone number manager 20 transfers the telephone number data to the tone dial section 13. The tone dial section 13 generates a tone signal formatted for the push button phone system in accordance with the telephone number data, and sends the tone signal to the telephone line via the NCU 15.

When the telephone line is connected to a facsimile machine at the destination, the CCD image sensor 4 and the motor 8 are driven again to restart scanning the paper P. The read image data is digitized by the binarization section 5, temporarily stored in the image memory 6, and is sequentially converted to a coded signal by the FAX coding section 21. At this time, the NCU 15 is connected to the modem 14, so that the coded signal is sent to the telephone line via the modem 14 and the NCU 15. If the displayed telephone number is found to be wrong after character recognition, the user should correct the number using the numerical keys of the input unit 10 and then manipulate the transmission key.

The facsimile machine 1 according to the first embodiment has the following advantages.

The circumscribing rectangle F is normalized as the character area 30 for a character pattern L whose aspect ratio R satisfies $\alpha<R<\beta$, the character area 30 obtained by adding spaces w1 to the circumscribing rectangle F is normalized for a character pattern L whose aspect ratio R satisfies R>β, and the character area 30 obtained by adding spaces w2 to the circumscribing rectangle F is normalized for a character pattern L whose aspect ratio R satisfies R<α. Therefore, characters that are not so vertically or horizontally elongated and whose aspect ratio R lies in the range of $\alpha<R<\beta$ are normalized to substantially similar patterns irrespective of the character sizes and shapes. It is thus possible to reduce the number of reference character patterns in the dictionary.

For a character significantly vertically or horizontally elongated, such as "1" or "−", space is added to the sides or top and bottom, respectively, to facilitate the recognition of such a character. For a character significantly elongated vertically like "7" or "9", if the circumscribing square is normalized as a character area, the pattern is deformed, making character recognition difficult. According to this embodiment, however, the space w1 or w2 to be added is set such that the character area 30 does not become a circumscribing square, thus even a significantly vertically elongated character can easily be recognized. The facsimile machine of this embodiment, unlike the character recognition apparatus disclosed in Japanese Unexamined Patent Publication No. 5-108882, needs no exclusive dictionaries for vertically elongated characters and horizontally elongated characters and can use a single common dictionary for all characters to be recognized.

The second embodiment of the invention will now be described. The second embodiment differs from the first embodiment in that the shaping of a circumscribing rectangle in steps S4 to S8 is selectively executed in accordance with the degree of complexity of each extracted character.

The first embodiment may raise the following problem when a character pattern that is significantly vertically or horizontally elongated and is relatively complex (e.g., "3" or "8") is normalized based on a circumscribing rectangle that has been shaped by adding space: The degree of stretch of a character pattern like "3" or "8", which is significantly vertically or horizontally elongated, after normalizing the circumscribing rectangle is less than that where the circumscribing rectangle is not shaped. The significantly vertically or horizontally elongated character pattern is not wide enough for effective extraction of the characteristic of the character pattern. This reduces the precision of character recognition. It is thus preferable that shaping of a circumscribing rectangle be selectively conducted in accordance with the degree of complexity of the target character.

According to the second embodiment, therefore, after forming the circumscribing rectangle of each character extracted by the character extraction section 16, the normalizer 17 checks the degree of complexity of the character and determines whether or not to shape the circumscribing rectangle. The degree of complexity is checked by specifying the densities of strokes that form the character by using a cross table.

Figure 6A:
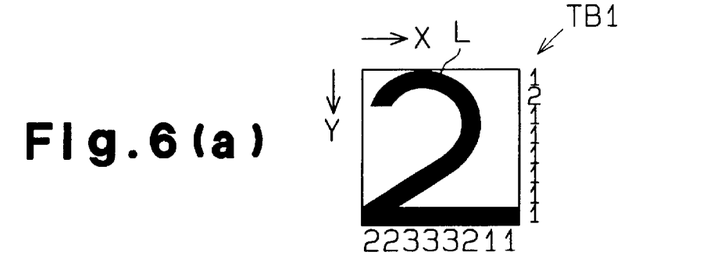
FIGS. 6(a) and 6(b) are explanatory diagrams of a cross table.
Figure 6B:
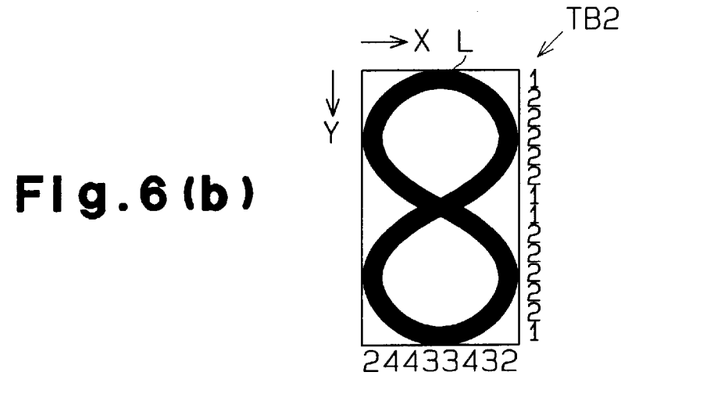

As shown in FIGS. 6(a) and 6(b), for example, cross tables TB1 and TB2 are prepared by counting the number of black dots (the cross number) that form a character pattern L at which a plurality of lines scanned at predetermined intervals in the X direction (horizontal direction) and the Y direction (vertical direction) cross one another.

Numerals written on the edges of the circumscribing rectangles in FIGS. 6(a) and 6(b) each indicate the cross number for the associated line. The intervals between lines are set to values necessary to create a cross table for checking the degree of complexity of each character. In the technical field of character recognition, the acquisition of the cross number is well known as disclosed in Japanese Unexamined Patent Publication No. 58-207183.

The normalizer 17 calculates the stroke densities in the X direction and Y direction using the prepared cross table. The stroke density in the X direction indicates the ratio of the cross numbers having a value of one to the total number of lines in the X direction and the stroke density in the Y direction indicates the ratio of the cross numbers having a value of one to the total number of lines in the Y direction. When the stroke density in the X direction is equal to or greater than 70% and the stroke density in the Y direction is equal to or less than 50%, the normalizer 17 determines that the ratio of the cross number having a value of one is relatively low and the target character is complicated, and thus decides not to shape the circumscribing rectangle. When the stroke density in the X direction exceeds 70% or the stroke density in the Y direction exceeds 50%, the normalizer 17 determines that the ratio of the cross numbers having a value of one is relatively high and the target character is not complicated, and then selects the process of shaping the circumscribing rectangle, which was discussed earlier with respect to the first embodiment. The reference values for the stroke densities in the X direction and Y direction that are used to determine the degree of complexity of the target character can be changed as desired.

Figure 5:
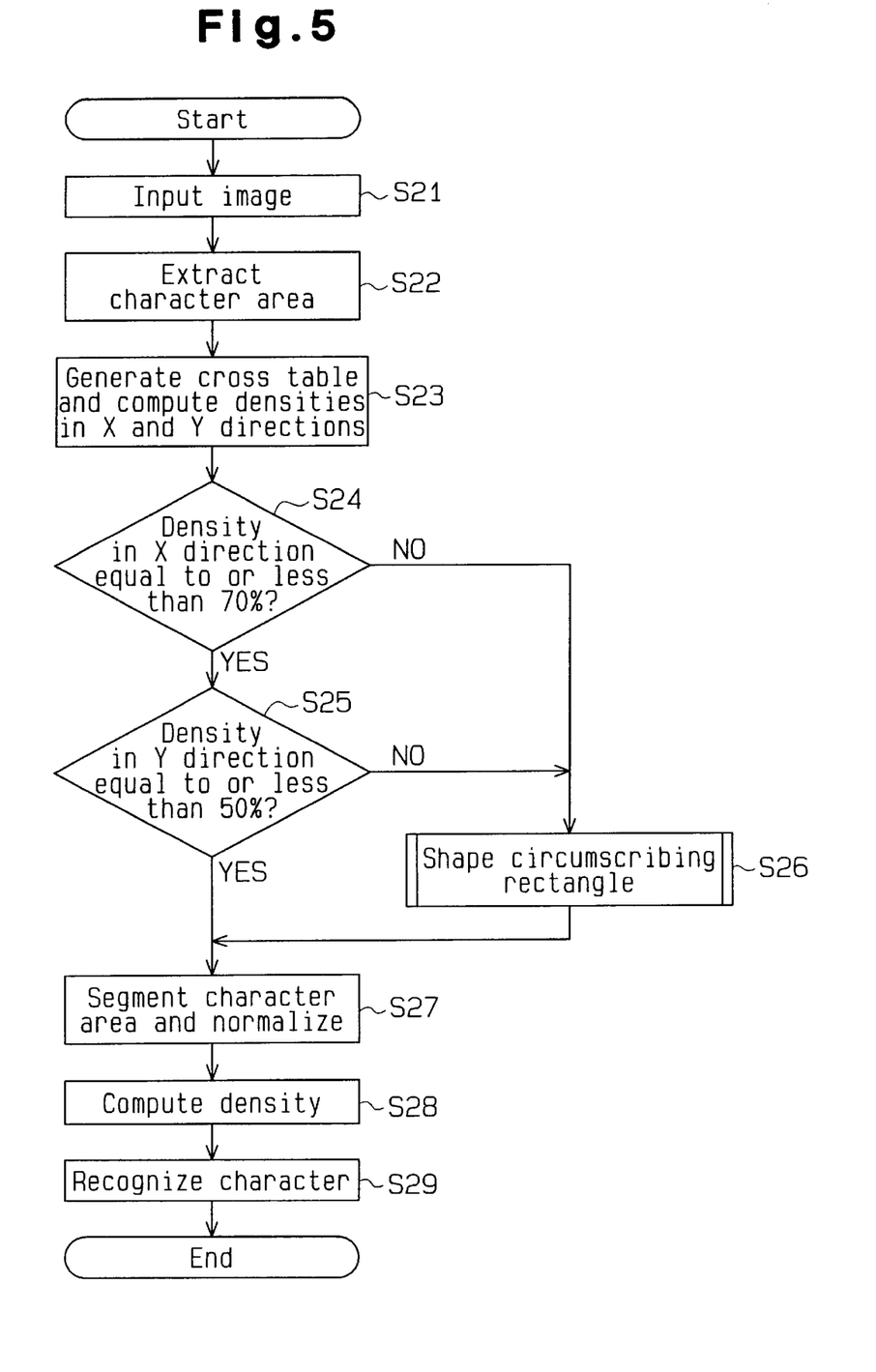
FIG. 5 is a flowchart of a character recognition process according to the second embodiment of the invention.

The operation of the thus constituted facsimile machine will now be discussed with reference to the flowchart in FIG. 5. The processes in steps S21 and S22 are the same as those in steps S1 and S2 of the first embodiment. In step S23, the cross table of each extracted character pattern is prepared and the stroke densities in the X direction and Y direction are calculated based on the cross table.

For example, the stroke density of the character pattern "2" in FIG. 6(a) in the X direction is 87.5% (7/8×100) and the stroke density in the Y direction is 25% (2/8×100). For the character pattern "8" in FIG. 6(b), the stroke density in the X direction is 28.6% (4/14×100) and the stroke density in the Y direction is 0% (0/8×100).

In the next step S24, it is determined if the stroke density in the X direction is equal to or less than 70%. With regard to the character pattern "2", for example, it is determined that the stroke density in the X direction is not equal to or less than 70%, and thus the character is not complex. Therefore, the process of shaping the circumscribing rectangle in step S26 is performed. This processing is the same as that in steps S4 to S8 in the first embodiment. With regard to the character pattern "8", for example, it is determined that the stroke density in the X direction is equal to or less than 70%, and thus the character is complex. Therefore, the processing proceeds to step S25.

In step S25, it is determined whether the stroke density in the Y direction is equal to or less than 50%. With regard to the character pattern "8", it is determined that the stroke density in the Y direction is equal to or less than 50%, and thus the character is complicated. In this case, the processing proceeds to step S27 without a executing the process of shaping the circumscribing rectangle. The processes in steps S27, S28 and S29 are the same as those in steps S9 to S11 in the first embodiment.

In step S27, the character area 31 containing the character pattern "8," which has not undergone the shaping of the circumscribing rectangle, is segmented to mesh areas 31a in the 8×8 matrix form to be normalized as shown in FIG. 7(a). Since no space is added to the circumscribing rectangle at this time, the vertically elongated character area 31 containing the vertically elongated character pattern L is sufficiently stretched in the horizontal direction. That is, the relatively complex and vertically elongated character pattern L of "3" or "8" is sufficiently stretched in the horizontal direction. Consequently, the characteristic of the character pattern can be effectively extracted in step S28, leading to an improvement of the character recognition precision.

According to the second embodiment, as apparent from the above, it is possible to easily recognize vertically elongated and horizontally elongated characters and improve the recognition precision for those characters. Further, the use of cross tables allows the degree of complexity of each character to be checked accurately.

The above-described embodiments may be modified as follows.

In the first and second embodiments, single constants $\alpha$ and $\beta$ are set respectively for determining a vertically elongated character and horizontally elongated character. Instead, two constants $\beta1$ and $\beta2$, for example, may be set to determine a vertically elongated character in two stages. In this case, for a character like the character "1," which has a prominent vertical-to-horizontal ratio, the value A may be set large (e.g., A=2) and the space to be added may be set wide, while for "7" or "9," the vertical-to-horizontal ratio of which is less prominent than that of "1", the value A may be set large enough to distinguish the characters (e.g., A=3). Of course, vertically elongated characters may be determined in three or more stages. Likewise, horizontally elongated characters may be determined in more than one stage and the space to be added may be set for each determination.

Although large space is added to both sides of a character as the character becomes vertically elongated in the first embodiment, alternatively, the space to be added may be set small as a character becomes vertically elongated.

Although a character is recognized by determining the similarity based on collation of the character pattern L after extraction of the characteristic with reference character patterns stored in the dictionary 19 in the first and second embodiments, a character may be recognized from the character pattern L after extraction of the characteristic by pattern recognition using a neural network.

The normalization including the process of shaping a circumscribing rectangle after it is determined in step S24 or S25 in the second embodiment that the degree of complexity of a character is low may be modified as follows. This modification will be discussed with reference to the flowchart in FIG. 8.

Figure 8:
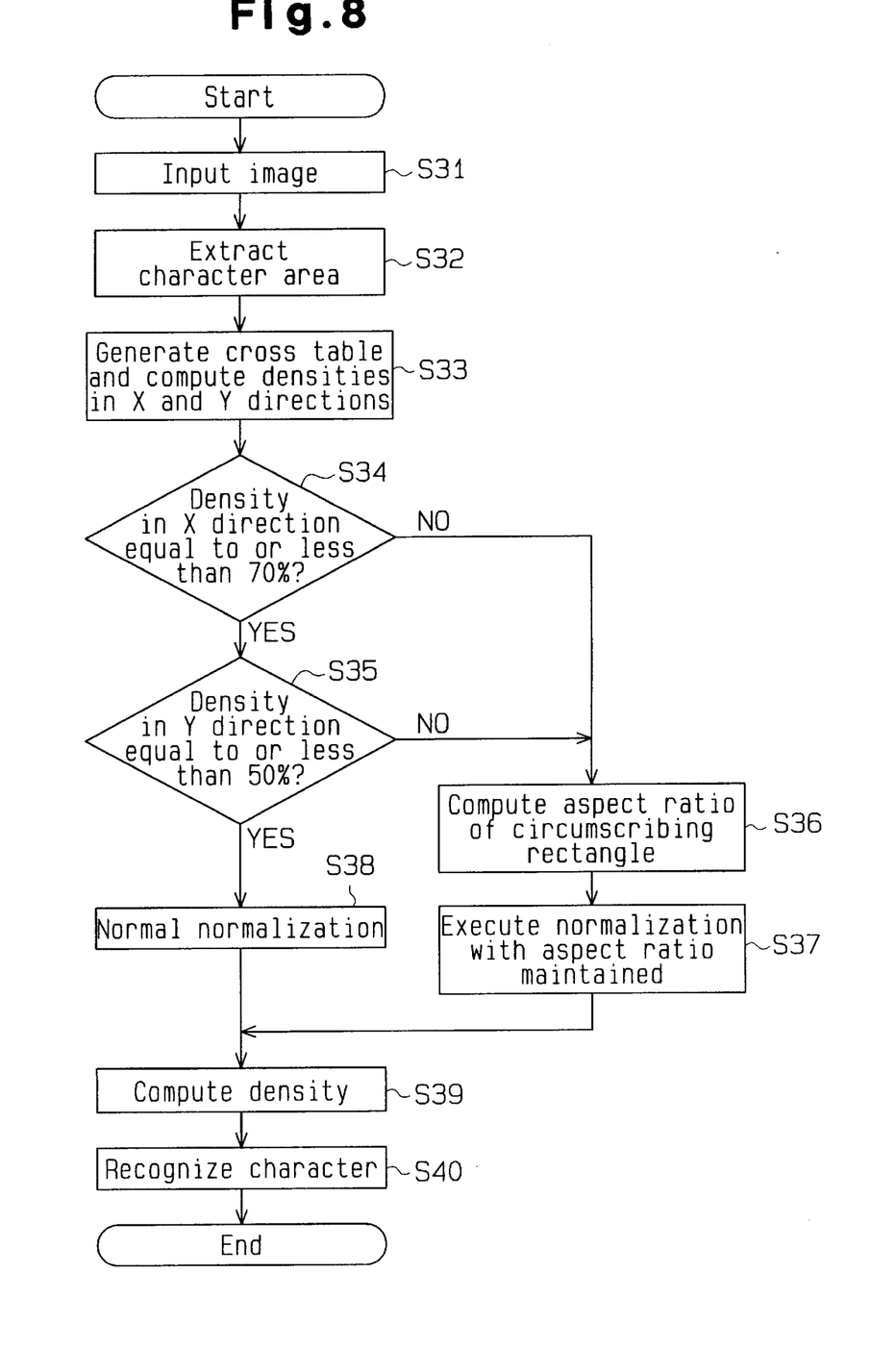
FIG. 8 is a flowchart of a character recognition process according to another embodiment.

Steps S31 to S35, S39 and S40 in FIG. 8 correspond to steps S21–S25, S28 and S29 of the second embodiment. When it is determined in step S34 that the stroke density in the X direction is not equal to or less than 70%, or when it is determined in step S35 that the stroke density in the Y direction is not equal to or less than 50%, the aspect ratio y/x (=R) for the circumscribing rectangle (character pattern) is computed in step S36.

In the subsequent step S37, the height or width of the circumscribing rectangle is changed based on the aspect ratio while maintaining the aspect ratio of the character pattern. When it is determined based on the aspect ratio that a character to be recognized is a vertically elongated character, the width of the circumscribing rectangle is increased. When it is determined that a character to be recognized is a horizontally elongated character, the height of the circumscribing rectangle is increased. Thereafter, the circumscribing rectangle with the increased height or width is segmented to mesh areas in the 8×8 matrix form. Then, the character area is converted to a square of a specified size of 8×8 for normalization with the aspect ratio of the character pattern maintained. Therefore, characters are normalized to substantially similar patterns regardless of the sizes and shapes of the characters.

When it is determined in step S35 that the stroke density in the Y direction is equal to or less than 50%, the normal normalization is performed in step S38. That is, alteration of the circumscribing rectangle based on the aspect ratio is not conducted, and the normal normalization is executed without keeping the aspect ratio of the character pattern.

Although the character normalization technique of the invention is used for a pre-process for a character recognition apparatus in the first and second embodiments, it may simply be adapted to a character normalizing apparatus. One example of the normalizing apparatus is a stroke editor.

Although a character is scanned horizontally and vertically at the time of generating a cross table in the second embodiment, either horizontal scanning or vertical scanning alone may be employed.

The third embodiment of the invention will now be described with reference to the accompanying drawings. Since the third embodiment differs from the first embodiment in the structure and operation of the normalizer 17, only the differences will be discussed below.

Figure 11:
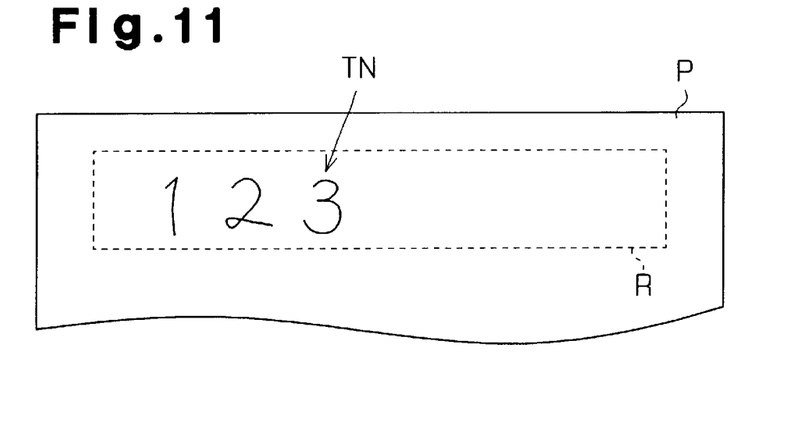
FIG. 11 is an explanatory diagram showing a telephone number written on paper.
Figure 14A:
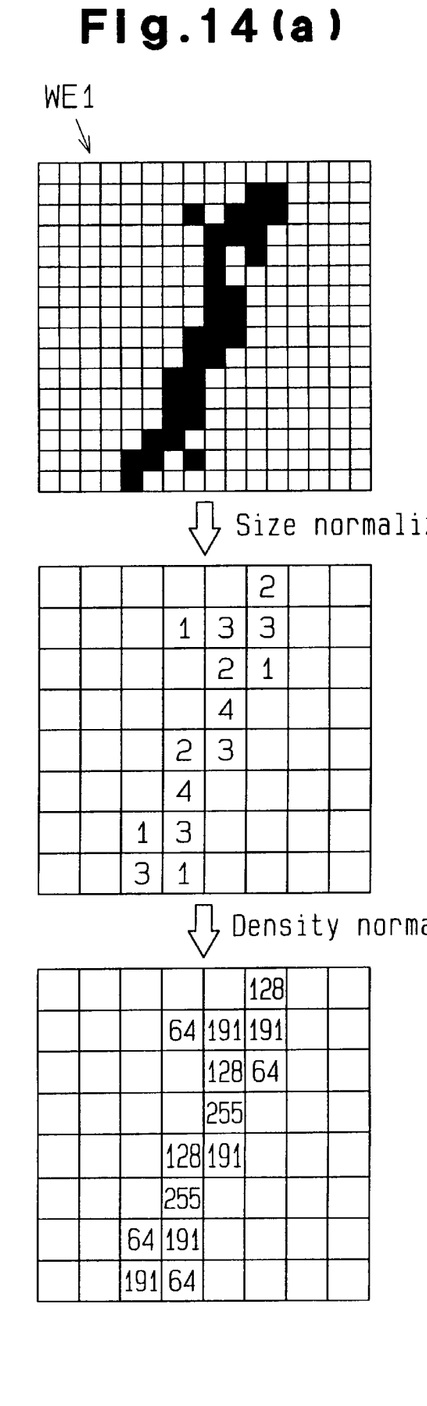
FIGS. 14(a) and 14(b) are explanatory diagrams showing a character normalizing process and a characteristic extracting process.
Figure 14B:
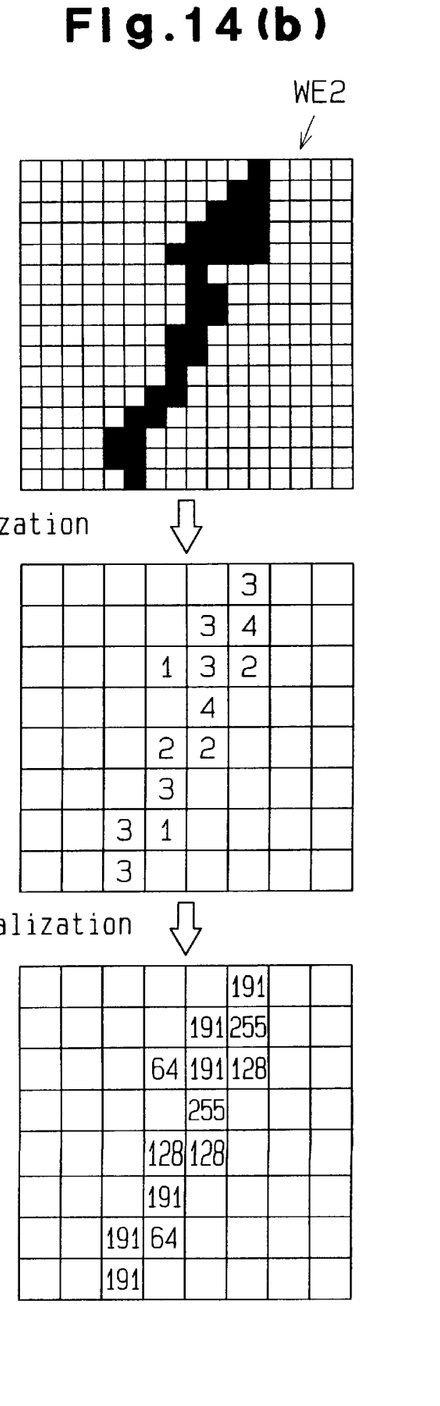

Character areas WE1 and WE2 in FIGS. 14(a) and 14(b) have been extracted based on two scannings of the same character "1" shown in FIG. 11, and have different distribution of black pixels.

The normalizer 17 in the third embodiment performs normalization by segmenting each of the character areas WE1 and WE2 to mesh areas 30a in the 8×8 matrix form as shown in FIGS. 14(a) and 14(b) in addition to forming the circumscribing rectangles of the character areas WE1 and WE2 (so-called size normalization). Then, the normalizer 17 acquires the number of black pixels present in each of the mesh areas (64 areas in this case) of the size-normalized character area, or a density before density normalization. The numerals in the individual mesh areas in the middle portions in FIGS. 14(a) and 14(b) represent mesh densities before density normalization.

Figure 13A:
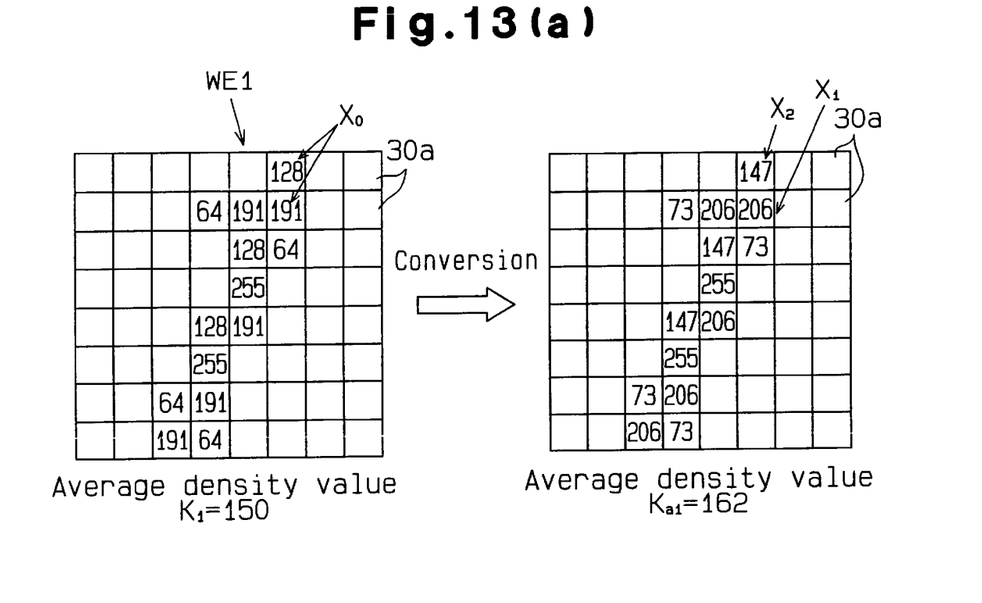
FIGS. 13(a) and 13(b) are explanatory diagrams showing a compensation process for a mesh density.
Figure 13B:
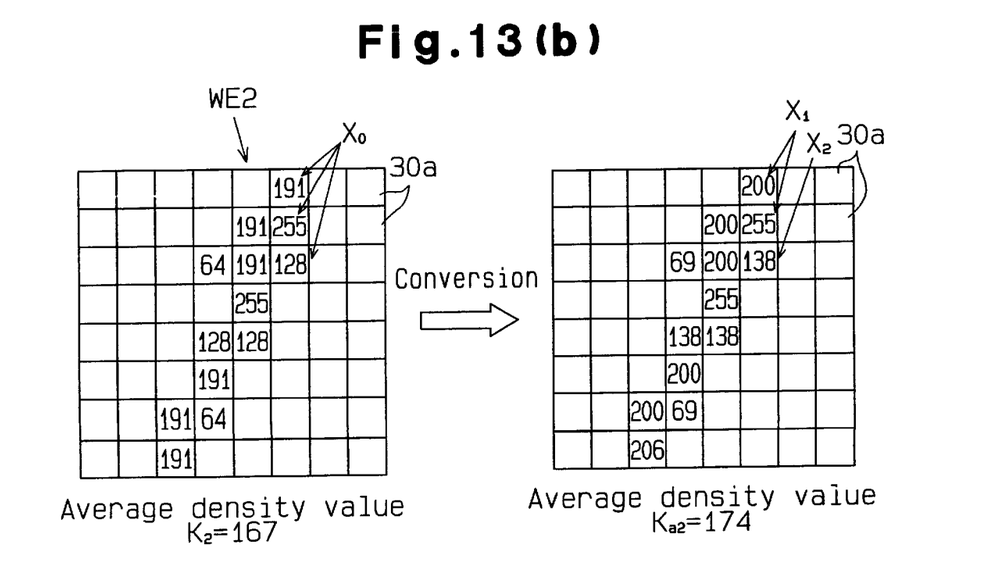

Further, the number of black pixels in each mesh area is divided by the maximum number of black pixels in all the mesh areas, and the resultant value is then multiplied by 255 to yield 256 mesh densities (so-called density normalization). The numerals in the individual mesh areas in the lower portions in FIGS. 14(a) and 14(b) and those of the left-hand sides in FIGS. 13(a) and 13(b) represent mesh densities $X_0$ after density normalization. Those mesh densities represent the characteristics of each character.

Every time the mesh densities of each character are obtained, the normalizer 17 computes the average value of the mesh densities and compensates the individual mesh densities $X_0$ using the acquired average density K and a previously set compensation density C. Specifically, when the mesh density $X_0$ satisfies the following condition (i), $X_0$ is compensated to $X_1$ according to an equation (1). When the mesh density $X_0$ satisfies the condition (ii), $X_0$ is compensated to $X_2$ according to an equation (2).

(i) When $X_0 \geq K$, $X_1=(X_0-K)\times(255-C)/(255-K)+C$     (1)

(ii) When $X_0 < K$, $X_2 = C \times (1-(K-X_0)/K)$     (2)

The average density K is obtained by dividing the sum of the mesh densities $X_0$ in the circumscribing rectangle by the number of mesh areas that have a density exceeding zero (where black points are present). The compensation density C is used to compensate the current average density K to minimize variation in the average density K, and is experimentally acquired. In this embodiment, the compensation density C is set to 180. Compensation according to the equations (1) and (2) is executed so that the current average density K of the mesh densities of each character approaches the compensation density C.

The operation of the facsimile machine 1 according to this embodiment will now be described. Since the processes in steps S51 and S52 in FIG. 12 are the same as those in steps S1 and S2 in the first embodiment, their description will not be repeated.

Figure 12:
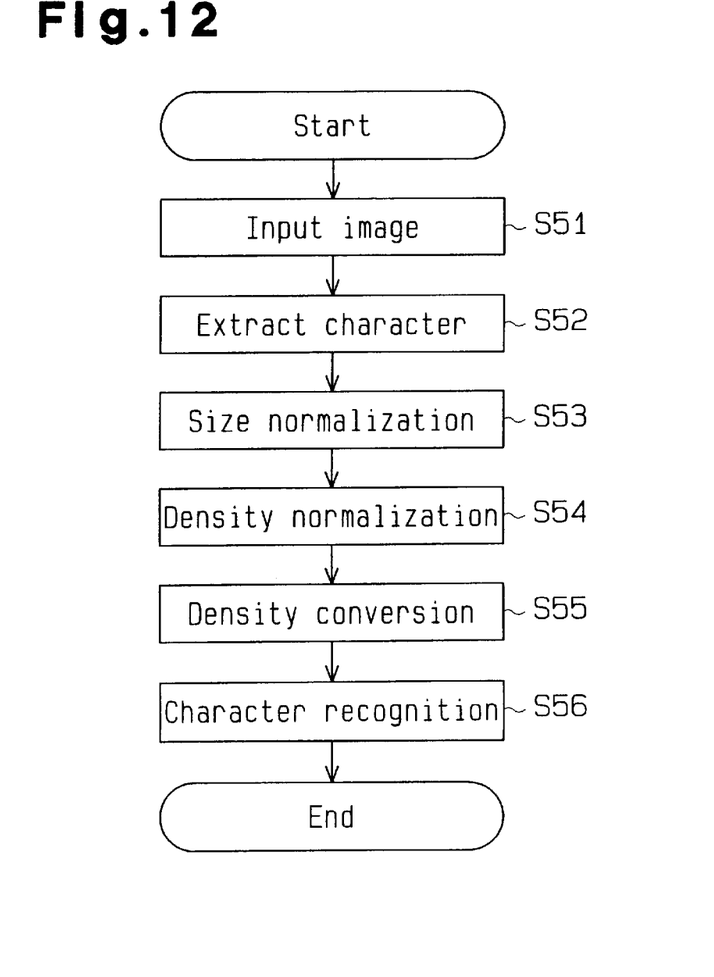
FIG. 12 is a flowchart illustrating the operation of a facsimile machine according to the third embodiment.

In step S53 in FIG. 12, the normalizer 17 forms the circumscribing rectangle of each extracted character to set its associated character area. Further, the normalizer 17 segments each character area into mesh areas in the 8×8 matrix form for normalization.

In step S54, the number of black pixels present in each of the mesh areas of the character area that has undergone size normalization is acquired, and the 256 mesh densities are computed for density normalization. FIG. 13 illustrates the densities of the individual mesh areas 30a of the character areas WE1 and WE2 after density normalization, respectively. The character areas WE1 and WE2 are each obtained by the first scanning and the second scanning of the character "1" shown in FIG. 11 and are represented in FIG. 14. The difference in the black pixel distribution between the two character areas is due to a mutual positional deviation of the paper to the CCD image sensor at the time of scanning the character.

In step S55, every time the mesh densities of each character are obtained, the normalizer 17 computes the average value of the mesh densities. Further, the normalizer 17 compensates the individual mesh densities $X_0$ to $X_1$ and $X_2$ using the acquired average density K and the previously set compensation density C according to the equations (1) and (2).

When the average density $K_1$ of the mesh densities for the character area WE1 is computed to be 150 as shown in FIG. 13, the individual mesh densities $X_0$ are compensated to $X_1$ and $X_2$ using the acquired average density $K_1$ and the previously set compensation density C according to the equations (1) and (2). As a result of this compensation, the average density $K_{a1}$ of the compensated mesh densities of the character "1" becomes 162, which is closer to the compensation density C=180.

When the average density $K_2$ of the mesh densities for the character area WE2 is computed to be 167, the individual mesh densities $X_0$ are likewise compensated to $X_1$ and $X_2$ according to the equations (1) and (2). As a result of this compensation, the average density $K_{a2}$ of the mesh densities of the character "1" becomes 174, which is closer to the compensation density C=180.

It is apparent that variation between the average values of the mesh density becomes less after compensation. (From ($K_1$=150, $K_2$=167) to ($K_{a1}$=162, $K_{a2}$=174)).

Although the density normalization in step S54 and the density conversion in step S55 are executed separately for easier understanding of the description, those processes may be performed in a single step.

Although the compensation density C=180 is experimentally acquired, this value is assumed to be appropriate not only because its ability to minimize variation in the average density K but also its ability to keep the balance of the mesh densities. When the compensation density C is set to a high value, e.g., a value close to 255, the mesh density of a mesh area having a relatively low density is shifted upward by the compensation to emphasize the characteristic it represents, which is advantageous. However, the difference in mesh density between mesh areas having relatively high densities becomes smaller or the difference in mesh density cannot be maintained, which undesirably upsets the balance of the mesh densities.

In this respect, it is assumed that about 180 is the appropriate compensation density that shifts the mesh density of any mesh area having a relatively low density and maintains the difference in density with respect to mesh areas having high mesh densities, thus ensuring balanced mesh densities between all the mesh areas. If variation in the average density K for each character scanning operation can be minimized, and if the balance of the mesh densities can be maintained, the compensation density C can be changed to values other than "180", such as "170" and "160".

In step S56, the character recognition section 18 executes character recognition based on the comparison of the characteristics of the input character pattern with the characteristics of the reference character patterns stored in the dictionary 19. In this manner, the individual characters written in the predetermined area A on the paper P are recognized, and the results are stored as telephone number data in the telephone number manager 20 and are displayed on the screen of the display section 11 under the control of the display controller 12.

The facsimile machine 1 according to this embodiment, specifically described above, has the following advantages.

As each mesh density is compensated using the equations (1) and (2) so that the average density K of the mesh areas approaches the compensation density C, the average densities K can be made nearly uniform to reduce variation in mesh density. As a result, a variation in the characteristics of each character is reduced. This facilitates character recognition using the dictionary 19 and reduces the occurrence of erroneous recognition.

Because the compensation density C used in the equations (1) and (2) is set to a value (180) that maintains the balance between mesh densities before compensation, it is possible to accurately perform character recognition while maintaining the characteristics of a character before compensation.

The range (dynamic range) of a change in mesh densities of a character is from 0 to 255, which is the same as that employed in the prior art. The difference in mesh density between individual characters is maintained before and after compensation. Even if compensation is performed, therefore, the number of characteristics of each character at the time of character recognition does not decrease much. Further, it is possible to suppress variation in characteristics when characters of the same type are recognized. This ensures accurate character recognition.

The third embodiment may be modified as follows.

The mesh density may be converted using different compensation equations from the equations (1) and (2).

Although compensation based on the equations (1) and (2) is executed after density normalization (which sets the density to a predetermined range of 0 to 255) in the third embodiment, the processes may be reversed. That is, density compensation may be performed first. In this case, the compensation density C' is given by the following equation:

$C'$=((maximum value of density (number of black pixels) before normalization) −(minimum value of density before normalization))×(compensation density $C$)/256

As the minimum value of the density before normalization is normally zero, the above equation can be rewritten as follows.

$C'$=maximum value of density before normalization ×compensation density $C$/256

The equation (1) is rewritten as follows:

$Z_1$=(density $Z_0$ before normalization−$K$) ×(maximum value of density before normalization−$C'$)/(maximum value of density before normalization−$K$)+$C'$ The equation (2) is rewritten as follows:

$Z_2$=$C'$×(1−($K$−$Z_0$)/$K$)

Note that the mesh areas, the densities $Z_0$ before normalization of which are to be obtained, are only those that contain black points. By using the densities $Z_1$ and $Z_2$ after compensation, the mesh densities can be computed after density normalization.

Although character recognition is executed using the dictionary 19 in the third embodiment, character recognition may be conducted by using a neuro computer as neural network type character recognition means or a Neumann type computer. The neural network type character recognition is well-known prior art described in, for example, Japanese Unexamined Patent Publication Nos. 4-177485, 4-260987 and 6-44409.

Although characters to be recognized are numerals and symbols which are used in a telephone number in the first to third embodiments, the target characters may further include hiragana, katakana, alphabets and/or kanji characters. The above-described embodiments may be adapted to other apparatuses than the facsimile machine.

What is claimed is:

1. A method of extracting characteristics of a character read by a reading unit, the method comprising the steps of:

segmenting a data area of the character into a plurality of mesh areas;

calculating via an algorithm, an uncorrected density with each mesh area relating to a number of elements that defined each character; and correcting, via a mapping, said uncorrected density of each mesh area to produce a corrected density of each mesh area such that said correction biases an average of said densities being corrected towards a single, predetermined average density, and such that the dynamic range of the corrected densities, defined as encompassing the set of all corrected densities that would, via said mapping, result from said plurality of characters, is the same as the dynamic range of the uncorrected densities, defined as encompassing the set of all uncorrected densities that would, via said algorithm, result from said plurality of characters of the corrected densities approaches a predetermined average density (C).

2. The method according to claim 1, wherein the predetermined average density is defined such that a balance between the uncorrected densities of the mesh areas is maintained in the corrected densities of the mesh areas.

3. The method according to claim 2, wherein the elements include black pixel data that form the data area.

4. A method of extracting characteristics of a character read by a reading unit, the method comprising the steps of:

segmenting a data area of each character into a plurality of mesh areas;

calculating via a first algorithm, a calculated value indicative of a ratio of elements of character data occupying each mesh area;

normalizing, via a second algorithm, a converted value of each mesh area to calculate a mesh density of each mesh area; and converting, via a mapping, said calculated value indicative of the ratio of elements to produce the converted value of each mesh area such that said conversion biases an average of said ratio of elements being converted towards a single, predetermined average ratio of elements after the calculating step and before the normalizing step, and such that the dynamic range of the calculated values of the mesh areas, defined as encompassing the set of all calculated values that would, via said algorithm result from said plurality of characters, is the same as the dynamic range of the converted values, defined as encompassing the set of all converted values that would, via said mapping, result from said plurality of characters.

5. The method according to claim 4, wherein the elements include black pixel data that form the data area.

6. A method of recognizing a character read by a reading unit, the method comprising the steps of:

segmenting a data area of the character into a plurality of mesh areas;

normalizing a size of the mesh area to calculate a normalized mesh area;

extracting characteristics of the character from the normalized mesh area by calculating, via an algorithm an uncorrected density of each mesh area in accordance with a ratio of elements occupying each normalized mesh area; and recognizing the character in accordance with the extracted characteristics, wherein the extracting step includes the step of correcting, via mapping said uncorrected density to produce a corrected density of each normalized mesh area such that an average of said corrected densities of said normalized mesh areas approaches a predetermined average density and such that the dynamic range of the corrected densities of the normalized mesh areas, defined as encompassing the set of all corrected densities that would, via said mapping, result from said plurality of characters, is the same as the dynamic range of the uncorrected densities, defined as encompassing the set of all uncorrected densities that would, via said algorithm, result from said plurality of characters.

7. The method according to claim 6, wherein the predetermined average density is defined such that a balance between the uncorrected densities of the mesh areas is maintained in the corrected densities of the normalized mesh areas.

8. The method according to claim 7, wherein the elements include black pixel data that form the data area.

9. An apparatus for recognizing a character, the apparatus comprising:

normalizing means for segmenting a data area of the character into a plurality of mesh areas and normalizing a size of each mesh area;

calculating means for calculating via an algorithm an uncorrected density within each mesh area relating to a number of elements that define each character;

correcting means for correcting, via a mapping, said uncorrected density of each mesh area such that said correcting means biases an average of said densities being corrected towards a single, predetermined average density, and such that the dynamic range of the corrected densities, defined as encompassing the set of all corrected densities that would, via said mapping, result from said plurality of characters, is the same as the dynamic range of the uncorrected densities, defined as encompassing the set of all uncorrected densities that would, via said algorithm, result from said plurality of characters; and recognizing means for recognizing the character based on the corrected density of each mesh area.

10. The apparatus according to claim 9, wherein the predetermined average density is defined such that a balance between the uncorrected densities of the mesh areas is maintained in the corrected densities of the mesh areas.

11. The apparatus according to claim 10, wherein the apparatus is a facsimile machine.

12. An apparatus for extracting characteristics of a character read by a reading unit, the apparatus comprising:

calculating means for segmenting a data area of the character into a plurality of mesh areas to calculate, via an algorithm, an uncorrected density relating to a number of elements that define each character included within each mesh area; and correcting means for correcting the uncorrected density of each mesh area to determine, via a mapping, a corrected density such that said correcting means biases an average of said densities being corrected towards a single, predetermined average density, and such tat the dynamic range of the corrected densities, defined as encompassing the set of all corrected densities that would, via said mapping, result from said plurality of characters, is the same as the dynamic range of the uncorrected densities, defined as encompassing the set of all uncorrected densities that would, via said algorithm, result from said plurality of characters.

13. The apparatus according to claim 12, wherein the predetermined average density is defined such that a balance between the uncorrected densities of the mesh areas is maintained in the corrected densities of the mesh areas.

* * * * *

UNITED STATES PATENT AND TRADEMARK OFFICE
CERTIFICATE OF CORRECTION

PATENT NO.   : 6,188,790 B1
DATED        : February 13, 2001
INVENTOR(S)  : Yoshikawa, Takatoshi et al.

It is certified that error appears in the above-identified patent and that said Letters Patent is hereby corrected as shown below:

<u>Title page,</u>
Item [73] Assignee: Sanyo Electric Co., Ltd.
Osaka (JP)

Tottori Sanyo Electric Co., Ltd.
Tottori-ken (JP)

Signed and Sealed this

Twenty-fifth Day of December, 2001

*Attest:*

JAMES E. ROGAN
*Attesting Officer*     *Director of the United States Patent and Trademark Office*